(12) United States Patent
Hara

(10) Patent No.: US 12,037,079 B2
(45) Date of Patent: Jul. 16, 2024

(54) FRONT SPROCKET ASSEMBLY FOR HUMAN-POWERED VEHICLE

(71) Applicant: Shimano Inc., Osaka (JP)

(72) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/223,258

(22) Filed: Jul. 18, 2023

(65) Prior Publication Data

US 2024/0166302 A1 May 23, 2024

(30) Foreign Application Priority Data

Nov. 18, 2022 (DE) .......................... 102022212336.0

(51) Int. Cl.
*B62M 9/10* (2006.01)
*F16H 55/30* (2006.01)

(52) U.S. Cl.
CPC ............ *B62M 9/105* (2013.01); *F16H 55/30* (2013.01); *F16H 2055/306* (2013.01)

(58) Field of Classification Search
CPC ... B62M 1/36; B62M 9/105; F16H 2055/306; F16H 55/30
USPC .................................................... 474/152, 78
See application file for complete search history.

(56) References Cited

U.S. PATENT DOCUMENTS

| | | | |
|---|---|---|---|
| 6,173,982 B1* | 1/2001 | Westergard .............. | B62M 9/14 280/261 |
| 7,153,229 B2* | 12/2006 | Matsumoto ............ | B62M 9/126 474/144 |
| 7,326,137 B2* | 2/2008 | van der Linde ......... | B62M 9/04 474/80 |
| 7,686,716 B2* | 3/2010 | Matsumoto .............. | B62M 9/10 474/80 |
| 9,725,132 B2* | 8/2017 | Hara ...................... | B62M 3/003 |
| 9,862,454 B2* | 1/2018 | Hara ...................... | B62M 1/36 |
| 10,005,520 B2* | 6/2018 | Hara ...................... | B60B 27/023 |
| 10,066,673 B2* | 9/2018 | Hara ...................... | B62M 1/36 |
| 10,150,533 B1* | 12/2018 | Hara ...................... | B62M 3/00 |
| 10,526,041 B2* | 1/2020 | Hara ...................... | B62M 9/02 |
| 2004/0014543 A1* | 1/2004 | Van Der Linde ...... | B62M 11/06 474/160 |
| 2004/0214670 A1* | 10/2004 | Matsumoto .............. | B62M 9/04 474/160 |
| 2006/0240919 A1* | 10/2006 | Matsumoto .......... | B62M 11/145 474/78 |
| 2013/0008282 A1* | 1/2013 | Johnson ................... | B62M 3/00 74/594.2 |
| 2015/0274253 A1* | 10/2015 | Hara ........................ | B62M 3/00 74/594.2 |
| 2017/0167542 A1* | 6/2017 | Hara ...................... | F16H 55/30 |

(Continued)

*Primary Examiner* — Henry Y Liu
(74) *Attorney, Agent, or Firm* — Global IP Counselors, LLP

(57) ABSTRACT

A front sprocket assembly basically includes a front sprocket, a sprocket carrier and at least one slide shaft. The front sprocket includes a sprocket body having at least one carrier mounting portion. The at least one carrier mounting portion has the at least one slide opening. The sprocket carrier includes at least one sprocket mounting portion. The at least one sprocket mounting portion has a first shaft-supporting portion and a second shaft-supporting portion. The at least one slide opening receives the at least one slide shaft between the first shaft-supporting portion and the second shaft-supporting portion.

24 Claims, 13 Drawing Sheets

(56) References Cited

U.S. PATENT DOCUMENTS

| | | | | |
|---|---|---|---|---|
| 2017/0233037 A1* | 8/2017 | Hara | ........................ | B62M 9/14 |
| | | | | 474/78 |
| 2017/0297649 A1* | 10/2017 | Hara | ...................... | B62M 1/105 |
| 2018/0290713 A1* | 10/2018 | Tetsuka | ................... | B62M 9/14 |

* cited by examiner

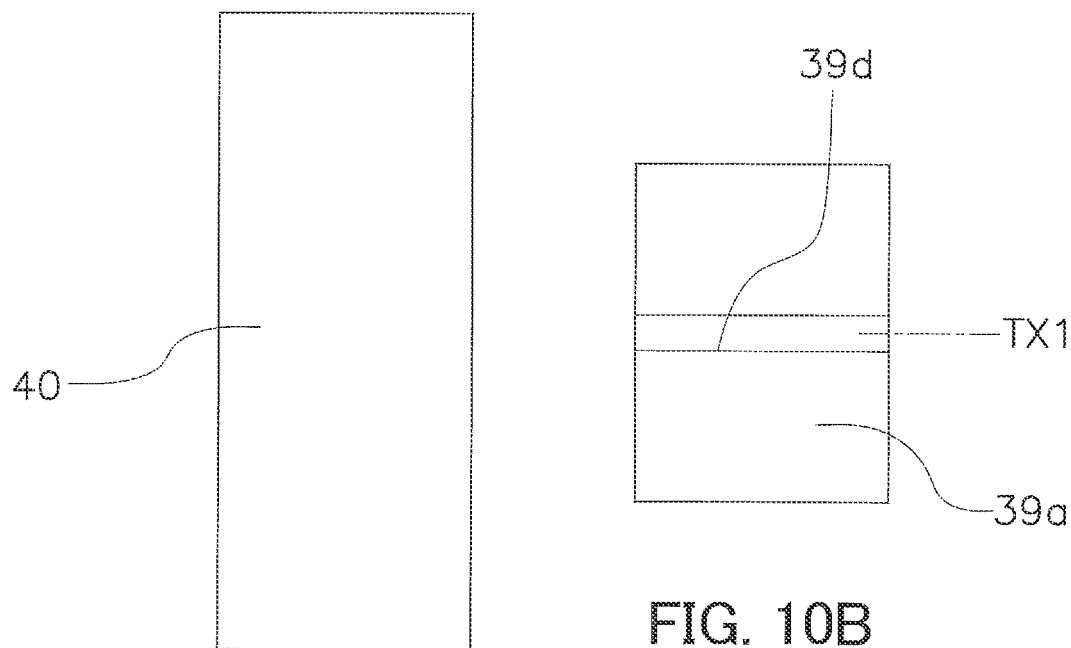
FIG. 10A
FIG. 10B
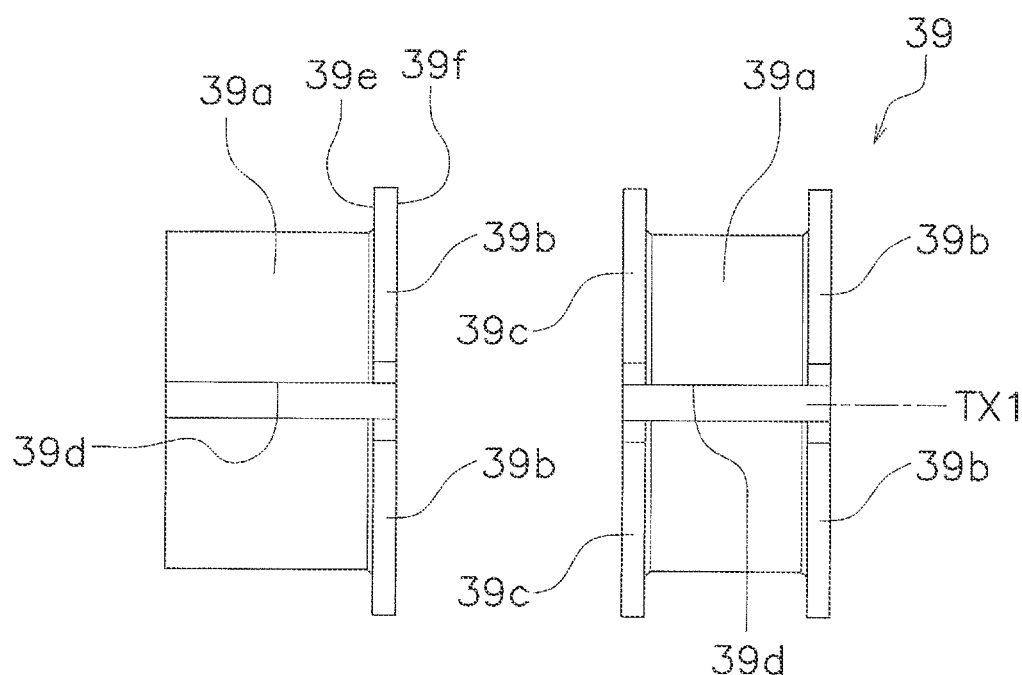
FIG. 10C
FIG. 10D

FRONT SPROCKET ASSEMBLY FOR HUMAN-POWERED VEHICLE

CROSS-REFERENCE TO RELATED APPLICATIONS

This application claims priority to German Patent Application No. 102022212336.0, filed on Nov. 18, 2022. The entire disclosure of German Patent Application No. 102022212336.0 is hereby incorporated herein by reference.

BACKGROUND

Technical Field

The present disclosure generally relates to a front sprocket assembly for a human-powered vehicle.

Background Information

Human-powered vehicles, especially bicycles, are becoming increasingly a more popular form of recreation as well as a means of transportation. Moreover, bicycling has become a very popular competitive sport for both amateurs and professionals. For example, U.S. Patent Application Publication No. 2013/0008282 A1 discloses the front sprocket assembly. The front sprocket assembly causes drive force to efficiently transmit from the front sprocket assembly to a rear sprocket assembly.

The front sprocket assembly disclosed in U.S. Patent Application Publication No. 2013/0008282 A1 includes a sprocket-displaceable structure disclosed as a transmission system in order to inhibit a drive chain from disengaging from a front sprocket. The sprocket-displaceable structure includes a front sprocket, a sprocket carrier connected to a crank arm and a slide shaft connecting the front sprocket and the sprocket carrier. The front sprocket is slidably supported by the slide shaft in a state where one end of the slide shaft is fixed to the sprocket carrier.

In the sprocket-displaceable structure disclosed in U.S. Patent Application Publication No. 2013/0008282 A1, the slide shaft is supported by the sprocket carrier in a cantilevered manner. However, when load acts on the slide shaft from a bicycle chain to the front sprocket, strength and rigidity of the slide shaft may be insufficient. Therefore, the drive force can't efficiently transmits from the crank arm to the rear sprocket assembly via the front sprocket.

SUMMARY

An object of the present invention is to improve strength and rigidity of a sprocket-displaceable structure of a front sprocket assembly.

In accordance with a first aspect of the present disclosure, a front sprocket assembly is used for a human-powered vehicle. The front sprocket assembly has a rotational center axis defining an axial direction, a radial direction and a circumferential direction. The front sprocket assembly comprises a front sprocket, a sprocket carrier and at least one slide shaft. The front sprocket includes a sprocket body having at least one carrier mounting portion and a plurality of sprocket teeth disposed on an outer periphery of the sprocket body in the circumferential direction. The sprocket carrier has at least one sprocket mounting portion configured to be coupled to the at least one carrier mounting portion of the sprocket body in a torque-transmitting manner. The at least one slide shaft has a shaft center axis, a first shaft end and a second shaft end. The second shaft end is opposite to the first shaft end in a shaft axial direction with respect to the shaft center axis. The at least one slide shaft is mounted to one of the at least one carrier mounting portion of the sprocket body and the at least one sprocket mounting portion of the sprocket carrier. The one of the at least one carrier mounting portion of the sprocket body and the at least one sprocket mounting portion of the sprocket carrier has a first shaft-supporting portion and a second shaft-supporting portion spaced apart from the first shaft-supporting portion in the shaft axial direction. The first shaft-supporting portion is configured to support the first shaft end of the at least one slide shaft. The second shaft-supporting portion is configured to support the second shaft end of the at least one slide shaft. The other of the at least one carrier mounting portion of the sprocket body and the at least one sprocket mounting portion of the sprocket carrier has at least one slide opening. The at least one slide opening is configured to receive the at least one slide shaft between the first shaft-supporting portion and the second shaft-supporting portion so that the front sprocket is displaceable relative to the sprocket carrier in at least the axial direction.

With the front sprocket assembly according to the first aspect, the first shaft end of the at least one slide shaft is supported by the first shaft-supporting portion, and the second shaft end of the at least one slide shaft is supported by the second shaft-supporting portion which is spaced apart from the first shaft-supporting portion.

The at least one slide shaft, the first shaft-supporting portion, the second shaft-supporting portion and the at least one slide opening constitute a sprocket-displaceable structure. The sprocket-displaceable structure enables the front sprocket to displace relative to the sprocket carrier in at least the axial direction. In this configuration, the front sprocket assembly is capable of improving strength and rigidity of the sprocket-displaceable structure because the at least one slide shaft is supported by the first shaft-supporting portion and the second shaft-supporting portion.

In accordance with a second aspect of the present disclosure, the front sprocket assembly according to the first aspect is configured so that the shaft axial direction is parallel to the axial direction of the front sprocket assembly in an assembled state of the front sprocket assembly.

With the front sprocket assembly according to the second aspect, the front sprocket assembly is capable of improving drive efficiency thereof.

In accordance with a third aspect of the present disclosure, the front sprocket assembly according to the first or second aspect further comprises a slide member. The slide member is configured to be mounted to the at least one slide opening and is configured to slide relative to the at least one slide shaft.

With the front sprocket assembly according to the third aspect, the front sprocket assembly is capable of smoothly sliding the front sprocket relative to the at least one slide shaft.

In accordance with a fourth aspect of the present disclosure, the front sprocket assembly according to the third aspect is configured so that the slide member includes a base metal and a resin layer. The base metal is configured to be mounted to the at least one slide opening. The resin layer is disposed on the base metal and is configured to slide relative to the at least one slide shaft.

With the front sprocket assembly according to the fourth aspect, the front sprocket assembly is capable of securely fixing the slide member to the at least one slide opening and smoothly sliding the front sprocket relative to the at least one slide shaft.

In accordance with a fifth aspect of the present disclosure, the front sprocket assembly according to the fourth aspect is configured so that the base metal is made of a base material including iron.

With the front sprocket assembly according to the fifth aspect, the front sprocket assembly is capable of securely fixing the slide member to the at least one slide opening.

In accordance with a sixth aspect of the present disclosure, the front sprocket assembly according to the fourth or fifth aspect is configured so that the resin layer is made of a resin material including solid lubricant.

With the front sprocket assembly according to the sixth aspect, the front sprocket assembly is capable of smoothly sliding the front sprocket relative to the at least one slide shaft over a prolonged period of time.

In accordance with a seventh aspect of the present disclosure, the front sprocket assembly according to any one of the fourth to sixth aspects is configured so that the solid lubricant includes polytetrafluoroethylene.

With the front sprocket assembly according to the seventh aspect, the front sprocket assembly is capable of smoothly sliding the front sprocket relative to the at least one slide shaft over a prolonged period of time.

In accordance with an eighth aspect of the present disclosure, the front sprocket assembly according to the sixth or seventh aspect is configured so that the resin layer includes metallic fabric.

With the front sprocket assembly according to the eighth aspect, the front sprocket assembly is capable of reducing backlash between the front sprocket and the at least one slide shaft and improving load resistance of the slide member.

In accordance with a ninth aspect of the present disclosure, the front sprocket assembly according to any one of the first to ninth aspects is configured so that the at least one slide shaft includes a supporting spindle and a slide cover. The supporting spindle has an intermediate portion positioned between the first shaft end and the second shaft end in the shaft axial direction. The slide cover is configured to be disposed on the intermediate portion.

With the front sprocket assembly according to the ninth aspect, the front sprocket assembly is capable of saving weight of the sprocket-displaceable structure as well as improving strength of the sprocket-displaceable structure.

In accordance with a tenth aspect of the present disclosure, the front sprocket assembly according to the ninth aspect is configured so that the supporting spindle is made of a spindle material. The slide cover is made of a cover material that is harder than the spindle material.

With the front sprocket assembly according to the tenth aspect, the front sprocket assembly is capable of saving weight of the sprocket-displaceable structure as well as improving strength of the sprocket-displaceable structure.

In accordance with an eleventh aspect of the present disclosure, the front sprocket assembly according to the tenth aspect is configured so that the spindle material is lighter than the cover material.

With the front sprocket assembly according to the eleventh aspect, the front sprocket assembly is capable of saving weight of the sprocket-displaceable structure.

In accordance with a twelfth aspect of the present disclosure, the front sprocket assembly according to the tenth or eleventh aspect is configured so that the spindle material includes aluminum.

With the front sprocket assembly according to the twelfth aspect, the front sprocket assembly is capable of saving weight of the sprocket-displaceable structure.

In accordance with a thirteenth aspect of the present disclosure, the front sprocket assembly according to any one of the tenth to twelfth aspects is configured so that the cover material includes iron.

With the front sprocket assembly according to the thirteenth aspect, the front sprocket assembly is capable of improving strength of the sprocket-displaceable structure.

In accordance with a fourteenth aspect of the present disclosure, the front sprocket assembly according to any one of the ninth to thirteenth aspects further comprises a slide member. The slide member is configured to be mounted to the at least one slide opening and is configured to slide relative to the slide cover of the at least one slide shaft.

With the front sprocket assembly according to the fourteenth aspect, the front sprocket assembly is capable of smoothly sliding the front sprocket relative to the slide cover of the at least one slide shaft.

In accordance with a fifteenth aspect of the present disclosure, the front sprocket assembly according to the fourteenth aspect is configured so that the slide member includes a base metal and a resin layer. The base metal is configured to be mounted to the at least one slide opening. The resin layer is disposed on the base metal and is configured to slide relative to the slide cover.

With the front sprocket assembly according to the fifteenth aspect, the front sprocket assembly is capable of securely fixing the slide member to the at least one slide opening and smoothly sliding the front sprocket relative to the slide cover of the at least one slide shaft.

In accordance with a sixteenth aspect of the present disclosure, the front sprocket assembly according to the fifteenth aspect is configured so that the base metal is made of a base material. The slide cover is made of a cover material that is harder than the base material.

With the front sprocket assembly according to the sixteenth aspect, the front sprocket assembly is capable of improving strength of the sprocket-displaceable structure and smoothly sliding the front sprocket relative to the slide cover of the at least one slide shaft.

In accordance with a seventh aspect of the present disclosure, the front sprocket assembly according to the sixteenth aspect is configured so that the spindle material is lighter than the cover material.

With the front sprocket assembly according to the seventeenth aspect, the front sprocket assembly is capable of saving weight of the sprocket-displaceable structure.

In accordance with an eighteenth aspect of the present disclosure, the front sprocket assembly according to the sixteenth or seventeenth aspect is configured so that the base material includes iron.

With the front sprocket assembly according to the eighteenth aspect, the front sprocket assembly is capable of securely fixing the slide member to the at least one slide opening.

In accordance with a nineteenth aspect of the present disclosure, the front sprocket assembly according to any one of the sixteenth to eighteenth aspects is configured so that the cover material includes iron.

With the front sprocket assembly according to the nineteenth aspect, the front sprocket assembly is capable of improving strength of the slide cover.

In accordance with a twentieth aspect of the present disclosure, the front sprocket assembly according to any one of the first to nineteenth aspects is configured so that the at least one slide shaft is mounted to the at least one sprocket mounting portion of the sprocket carrier.

With the front sprocket assembly according to the twentieth aspect, the front sprocket assembly is capable of improving strength of the sprocket-displaceable structure.

In accordance with a twenty-first aspect of the present disclosure, the front sprocket assembly according to the twentieth aspect is configured so that the at least one sprocket mounting portion of the sprocket carrier has the first shaft-supporting portion and the second shaft-supporting portion.

With the front sprocket assembly according to the twenty-first aspect, the front sprocket assembly is capable of improving strength of the sprocket-displaceable structure.

In accordance with a twenty-second aspect of the present disclosure, the front sprocket assembly according to the twentieth or twenty-first aspect is configured so that the at least one carrier mounting portion of the sprocket body has the at least one slide opening.

With the front sprocket assembly according to the twenty-second aspect, the front sprocket assembly is capable of improving strength of the sprocket-displaceable structure.

In accordance with a twenty-third aspect of the present disclosure, the front sprocket assembly according to the twenty-second aspect further comprises a slide member. The slide member is configured to be mounted to the at least one slide opening and is configured to slide relative to the at least one slide shaft.

With the front sprocket assembly according to the twenty-third aspect, the front sprocket assembly is capable of smoothly sliding the front sprocket relative to the at least one slide shaft.

In accordance with a twenty-fourth aspect of the present disclosure, the front sprocket assembly according to the twenty-third aspect is configured so that the slide member includes a base metal and a resin layer. The base metal is configured to be mounted to the at least one slide opening. The resin layer is disposed on the base metal and is configured to slide relative to the at least one slide shaft.

With the front sprocket assembly according to the twenty-fourth aspect, the front sprocket assembly is capable of securely fixing the slide member to the at least one slide opening and smoothly sliding the front sprocket relative to the at least one slide shaft.

Also, other objects, features, aspects and advantages of the disclosed front sprocket assembly will become apparent to those skilled in the art from the following detailed description, which, taken in conjunction with the annexed drawings, discloses preferred embodiments of the front sprocket assembly.

BRIEF DESCRIPTION OF THE DRAWINGS

Referring now to the attached drawings, which form a part of this original disclosure:

FIG. 10A is a top view of a base member used to form the slide member illustrated in FIGS. 8 and 9 according to the first embodiment;

FIG. 10B is a top view of a molded base member used to form the slide member illustrated in FIGS. 8 and 9 according to the first embodiment;

FIG. 10C is a top view of a bent base member used to form the slide member illustrated in FIGS. 8 and 9 according to the first embodiment;

FIG. 10D is a top view of the slide member illustrated in FIGS. 8 and 9 according to the first embodiment;

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

In the following the embodiments, in a case where the plurality of members and portions corresponds to each other, the corresponding members and the corresponding portions is indicated with the same reference sign.

First Embodiment

Figure 1:
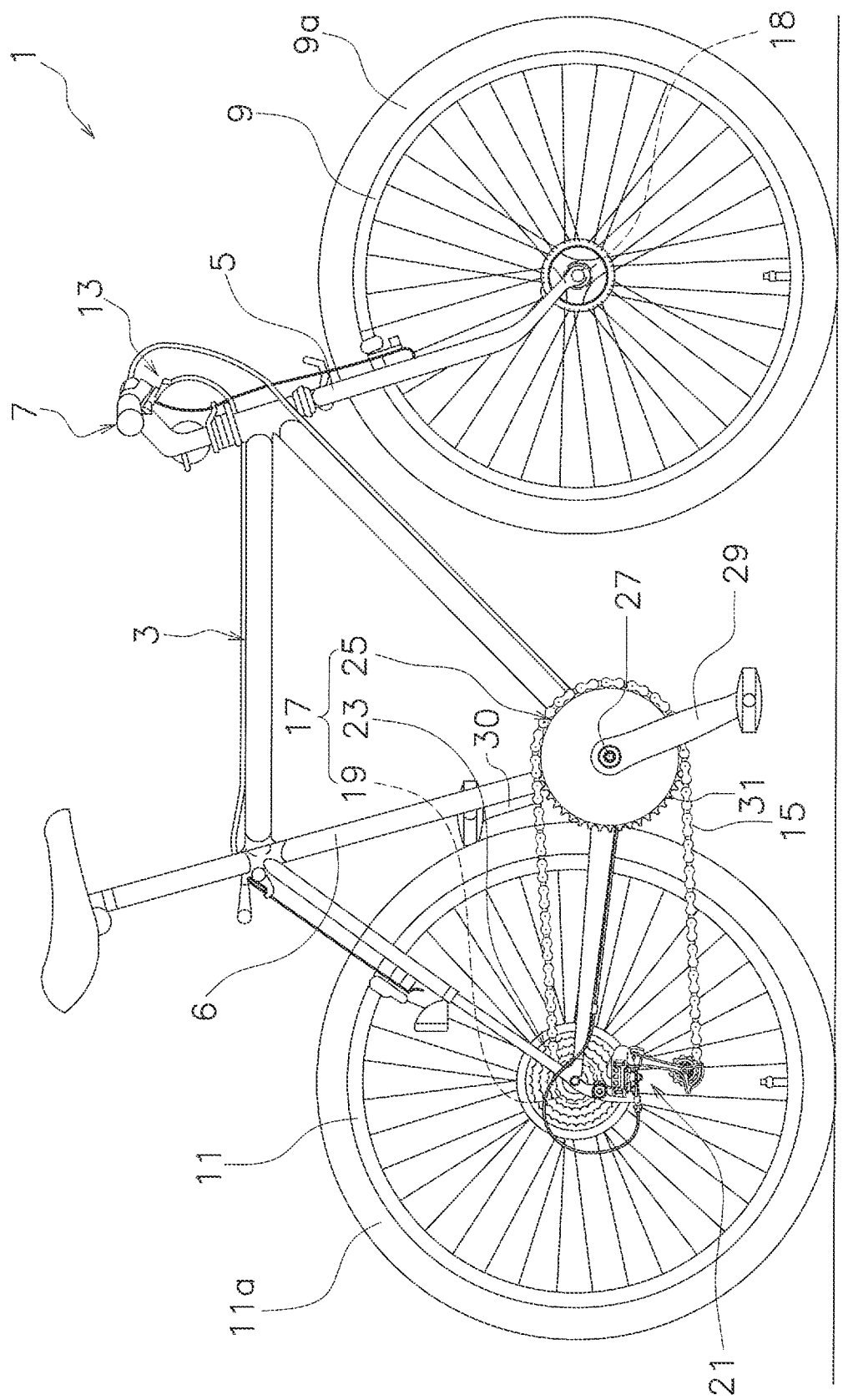
FIG. 1 is a side elevational view of a bicycle including a crank assembly having a front sprocket assembly according to a first embodiment of the present disclosure.

As shown FIG. 1, a bicycle 1 includes a frame 3, a front fork 5, a handle 7, a front wheel 9, a rear wheel 11, a shifting operation device 13, a drive chain 15 and a drive train 17. The bicycle 1 is an example of a human-powered vehicle which is described in claims. The front fork 5 is rotatably attached to the frame 3. The handle 7 is fixed to the front fork 5. The front wheel 9 is rotatably attached to the front fork 5. The rear wheel 11 is rotatably attached to a rear portion of the frame 3 via a rear hub assembly 19. A front tire 9a is attached to the front wheel 9. A rear tire 11a is attached to the rear wheel 11. The shifting operation device 13 is attached to the handle 7. The shifting operation device 13 operates a bicycle rear derailleur 21 via a control cable. The bicycle rear derailleur 21 is, for example, attached to a rear portion of the frame 3.

The bicycle rear derailleur 21 moves the drive chain 15 from one bicycle rear sprocket of a rear sprocket assembly 23 to another bicycle rear sprocket of the rear sprocket assembly 23 by the shifting operation device 13.

The drive train 17 mainly includes the rear hub assembly 19, the rear sprocket assembly 23, and a crank assembly 25. The drive chain 15 can also belong to the drive train 17. The rear hub assembly 19 is mounted on the rear portion of the frame 3. The rear hub assembly 19 rotatably supports the rear sprocket assembly 23.

The rear sprocket assembly 23 is mounted to the rear hub assembly 19. The rear sprocket assembly 23 includes at least one rear sprocket. The at least one rear sprocket includes a plurality of rear sprockets. The at least one rear sprocket engages with the drive chain 15.

Figure 2:
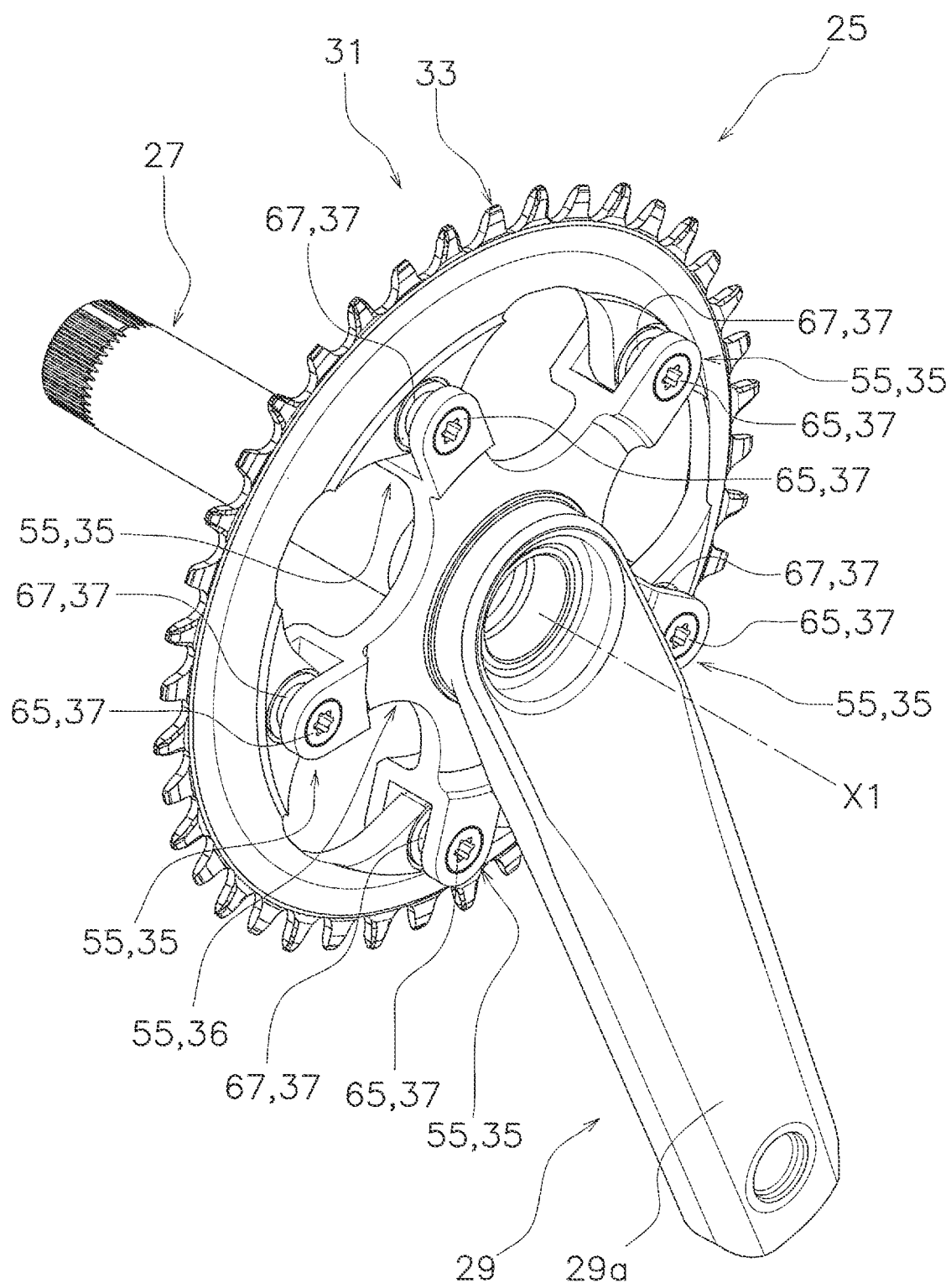
FIG. 2 is a perspective view of a crank assembly according to the first embodiment.

As shown in FIG. 1, the crank assembly 25 is rotatably supported on a lower portion of the frame 3. The crank assembly 25 is shown by a simplified drawing in FIG. 1. As shown in FIGS. 1 and 2, the crank assembly 25 includes a crank shaft 27 and a front sprocket assembly 31. The crank shaft 27 is rotatably supported on the lower portion of the frame 3 via a bottom bracket.

The crank assembly 25 includes a pair of crank arms 29 and 30, for example, a right crank arm 29 and a left crank arm 30. The right and left crank arms 29 and 30 are shown in FIG. 1. Only the right crank arm 29 is shown in FIG. 2. The right and left crank arms 29 and 30 are mounted to both ends of the crank shaft 27. A pair of pedals is respectively mounted to the right and left crank arms 29 and 30.

Figure 3:
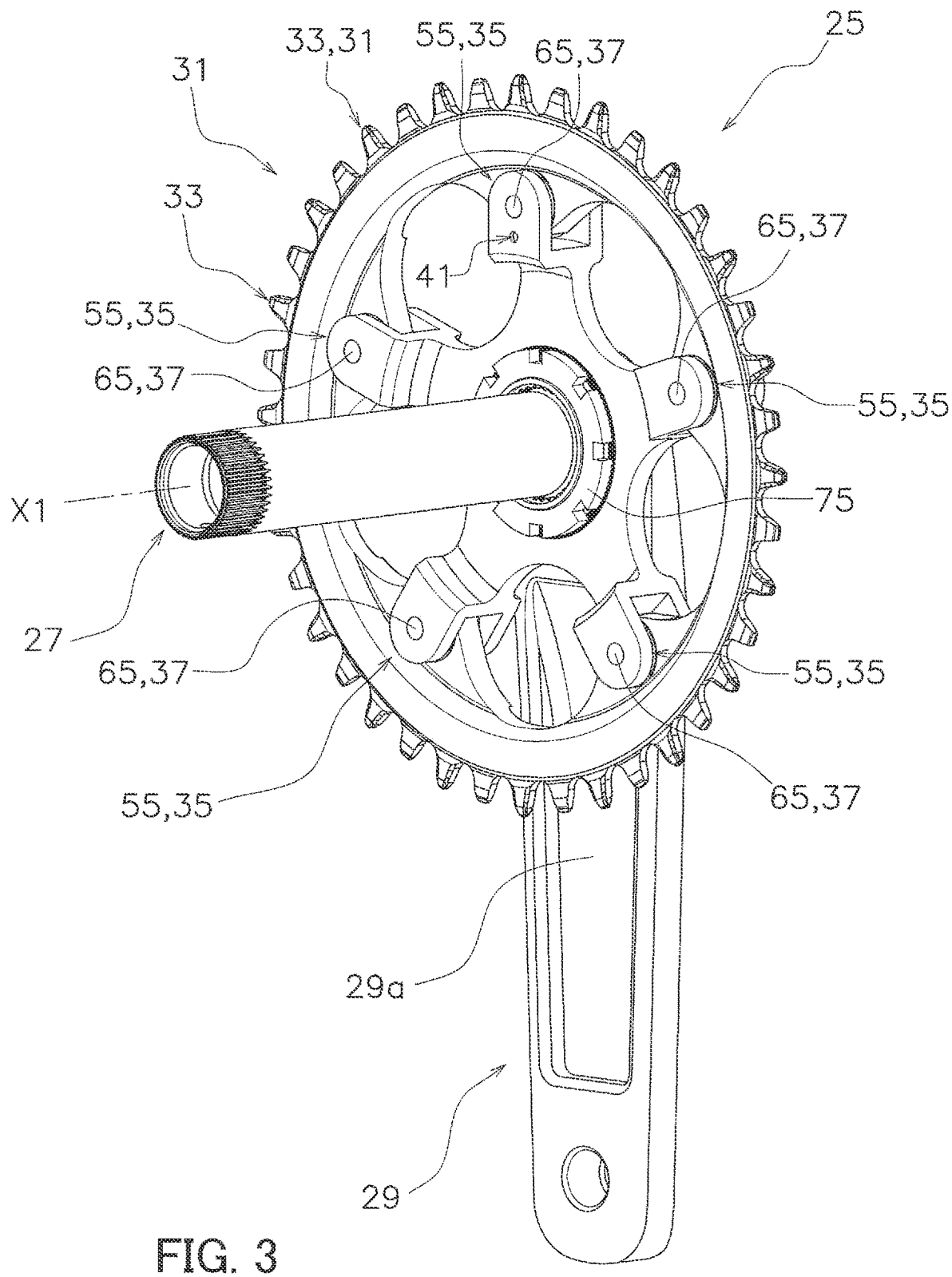
FIG. 3 is a perspective view of the crank assembly according to the first embodiment.

As shown in FIG. 1, the front sprocket assembly 31 is used for the bicycle 1. As shown in FIGS. 2 and 3, the front sprocket assembly 31 has a rotational center axis X1 defining an axial direction, a radial direction and a circumferential direction.

The axial direction is defined by a direction in which the rotational center axis X1 extends. The radial direction is defined by a direction which vertically extends from the rotational center axis X1. The circumferential direction is defined by a direction which extends around the rotational center axis X1.

Figure 4:
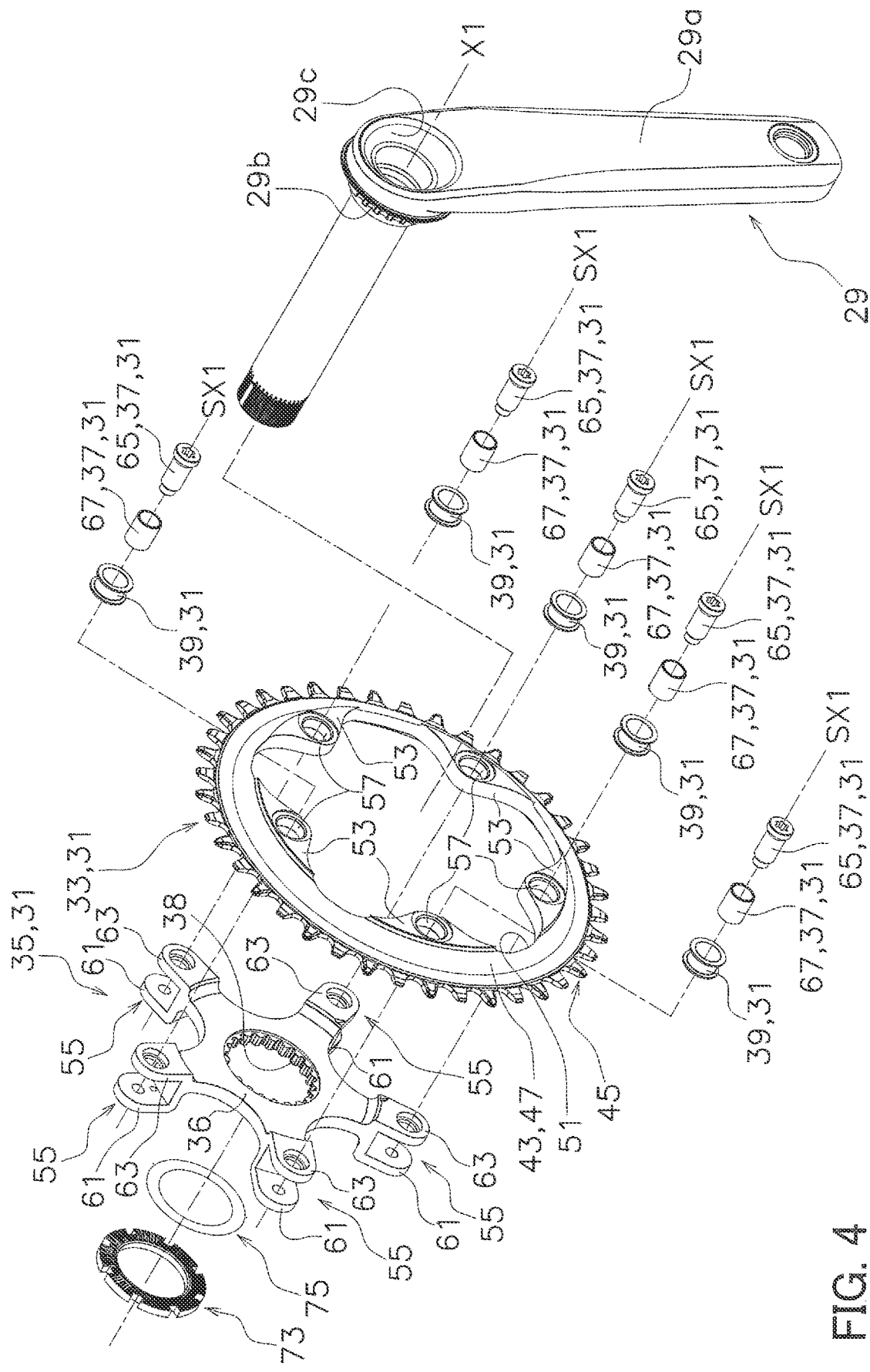
FIG. 4 is an exploded perspective view of the crank assembly according to the first embodiment.

As shown in FIGS. 2, 3 and 4, the front sprocket assembly 31 is mounted to the crank shaft 27 or one of the pair of crank arms 29 and 30. In this embodiment, the front sprocket assembly 31 is mounted to the one of the pair of crank arms 29 and 30, for example, the right crank arm 29.

The right crank arm 29 includes an arm portion 29a and an assembly mountable portion 29b which is shown in FIG. 4. As shown in FIGS. 2 and 3, the front sprocket assembly 31 is mounted to the right crank arm 29 via the assembly mountable portion 29b.

As shown in FIG. 4, the assembly mounted portion 29b is provided on the crank arm 29. Specifically, the assembly mountable portion 29b is provided around a hole portion 29c of the crank arm 29. The assembly mountable portion 29b can be provided on the crank shaft 27, instead of the crank arm 29.

One end of the crank shaft 27 is mounted in the hole portion 29c. The assembly mountable portion 29b protrudes from the arm portion 29a in the axial direction. The assembly mountable portion 29b is formed in a tubular shape. A plurality of external spline teeth is provided to the assembly mountable portion 29b to engage with a plurality internal spline teeth of the front sprocket assembly in a torque transmitting manner.

As shown in FIGS. 2, 3 and 4, the front sprocket assembly 31 comprises a front sprocket 33, a sprocket carrier 35 and at least one slide shaft 37. As shown in FIG. 4, the front sprocket assembly 31 further comprises a slide member 39. As shown in FIG. 3, the front sprocket assembly 31 further comprises a travel-distance adjustment structure 41.

The front sprocket 33 engages with the drive chain 15. As shown in FIG. 4, the front sprocket 33 includes a sprocket body 43 and a plurality of sprocket teeth 45. The sprocket body 43 has at least one carrier mounting portion 53. One of the at least one carrier mounting portion 53 of the sprocket body 43 and at least one sprocket mounting portion 55 of the sprocket carrier 35 has a first shaft-supporting portion 61 and a second shaft-supporting portion 63 spaced apart from the first shaft-supporting portion 61 in the shaft axial direction. In this embodiment, the one of the at least one carrier mounting portion 53 of the sprocket body 43 and the at least one sprocket mounting portion 55 of the sprocket carrier 35 is the at least one sprocket mounting portion 55 of the sprocket carrier 35. In other words, as shown in FIG. 4, the at least one sprocket mounting portion 55 of the sprocket carrier 35 has the first shaft-supporting portion 61 and the second shaft-supporting portion 63. The other of the at least one carrier mounting portion 53 of the sprocket body 43 and the at least one sprocket mounting portion 55 of the sprocket carrier 35 has at least one slide opening 57. In this embodiment, the other of the at least one carrier mounting portion 53 of the sprocket body 43 and the at least one sprocket mounting portion 55 of the sprocket carrier 35 is the at least one carrier mounting portion 53 of the sprocket body 43. In other words, as shown in FIG. 4, the at least one carrier mounting portion 53 of the sprocket body 43 has the at least one slide opening 57.

Figure 5:
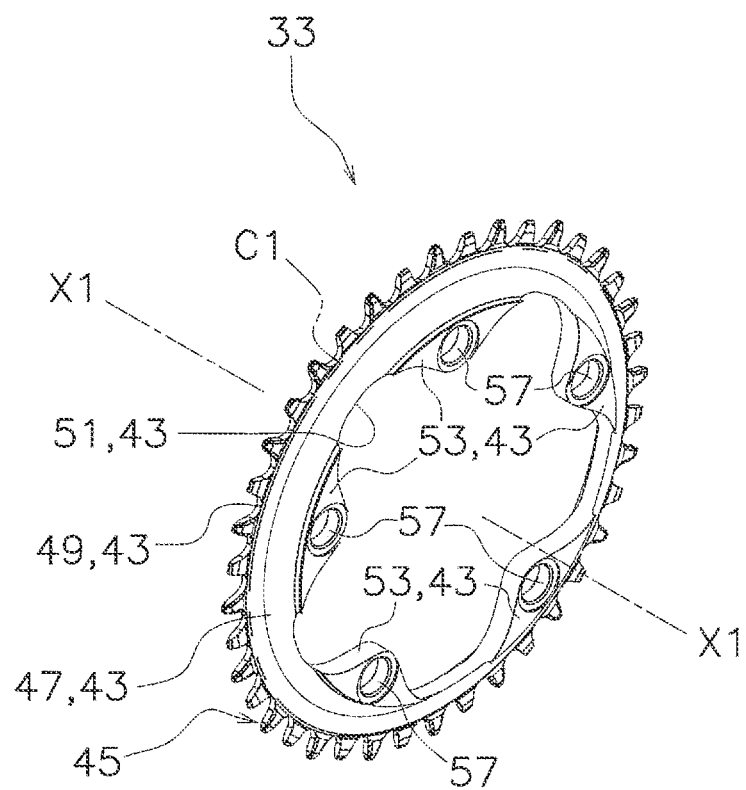
FIG. 5 is a perspective view of a front sprocket of the crank assembly according to the first embodiment.

As shown in FIG. 5, the sprocket body 43 has an outer periphery 49, an inner periphery 51 and the at least one carrier mounting portion 53. Specifically, the sprocket body 43 has a main body 47, an outer periphery 49, an inner periphery 51 and the at least one carrier mounting portion 53.

The main body 47 is formed in an annular shape. The outer periphery 49 is defined by a tooth bottom circle Cl of the front sprocket 33. The inner periphery 51 is defined by an innermost periphery of the main body 47.

Figure 6:
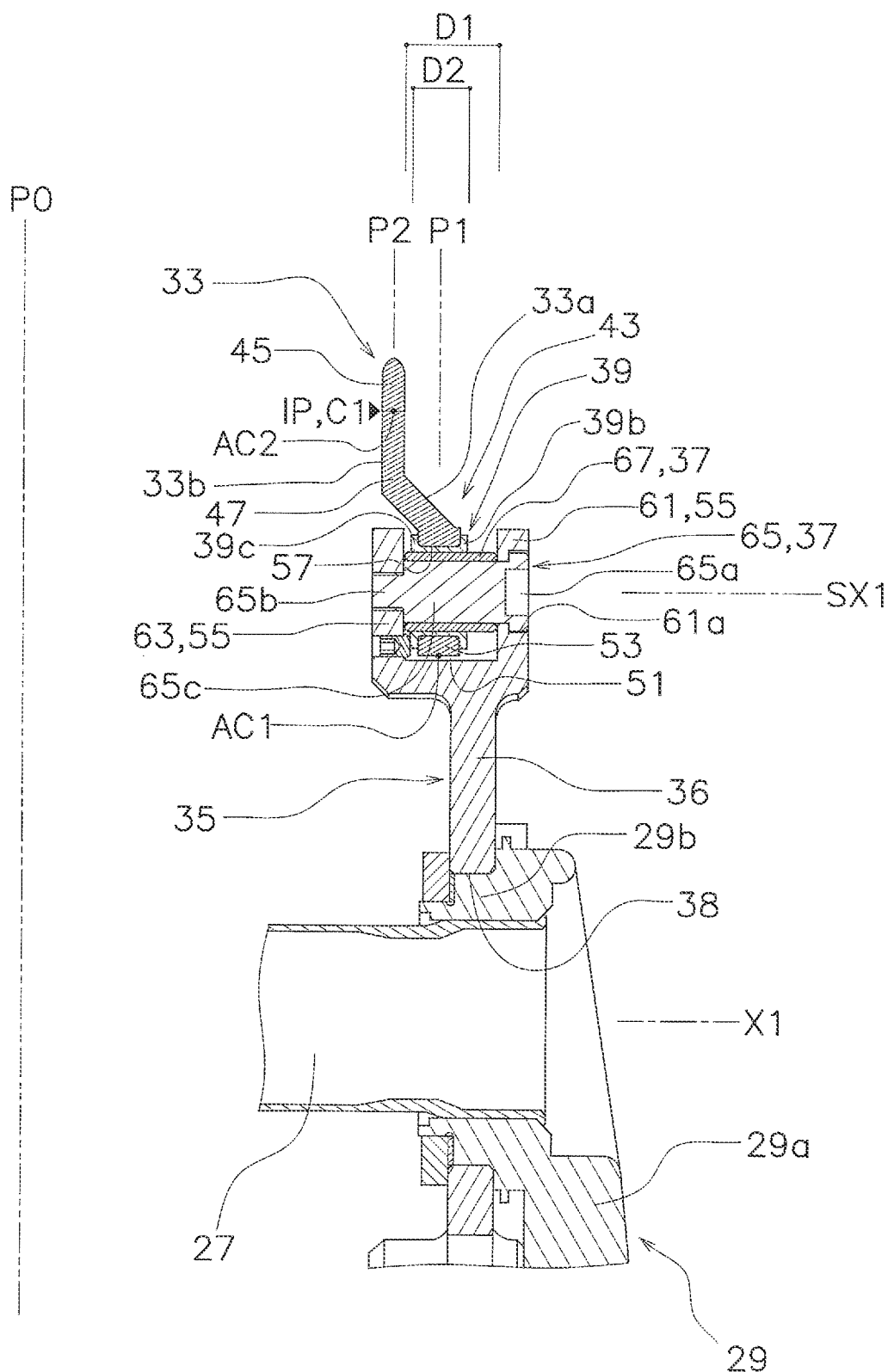
FIG. 6 is a partial cross-sectional view of the crank assembly according to the first embodiment.

An axial position of the sprocket body 43 is defined as follows. As shown in FIG. 6, the axial position of the sprocket body 43, for example, the axial position of the main body 47 is defined by a radially inner sprocket-body center plane P1.

The radially inner sprocket-body center plane P1 is defined to bisect the inner periphery 51 of the sprocket body 43 of the front sprocket 33 in the axial direction so as to extend in the radial direction.

For example, the radially inner sprocket-body center plane P1 is defined to bisect the inner periphery 51 of at least one carrier mounting portion 53 in the axial direction so as to extend in the radial direction.

Specifically, the radially inner sprocket-body center plane P1 passes an axial center AC1 of the inner periphery 51 of at least one carrier mounting portion 53 and extends in the radial direction in a case where the front sprocket 33 is cut by a cutting plain which includes a shaft center axis SX1, the rotational center axis X1 and a toot-tip of the sprocket tooth 45.

An axial position of the sprocket teeth 45 is defined as follows. The axial position of the sprocket teeth 45 is defined by a radially inner sprocket-tooth center plane P2.

The radially inner sprocket-tooth center plane P2 is defined to bisect a tooth bottom of at least one of the plurality of sprocket teeth 45 in the axial direction so as to extend in the radial direction.

For example, the radially inner sprocket-tooth center plane P2 passes an axial center AC2 of a tooth bottom of the front sprocket 33 and extends in the radial direction. The tooth bottom is the closest tooth bottom to the tooth bottom circle Cl.

Specifically, the radially inner sprocket-tooth center plane P2 passes an intersection point IP of the cutting plane and a circle which passes the axial center AC2 of the tooth bottom and extends in the radial direction.

As shown in FIG. 6, the radially inner sprocket-tooth center plane P2 is offset from the radially inner sprocket-body center plane P1 in the axial direction.

For example, the front sprocket 33 has an axially outwardly facing surface 33a and an axially inwardly facing surface 33b provided on a reverse side of the axially outwardly facing surface 33a in the axial direction.

The axially inwardly facing surface 33b is configured to face toward an axial center plane P0 of the bicycle 1 in the axial direction in a mounting state where the front sprocket assembly 31 is mounted to the bicycle 1.

The radially inner sprocket-body center plane P1 is disposed between the radially inner sprocket-tooth center plane P2 and the axially outwardly facing surface 33a in the axial direction at a radial location of the inner periphery 51 of the sprocket body 43. The radially inner sprocket-tooth center plane P2 is disposed between the axially inwardly facing surface 33b and the radially inner sprocket-body center plane P1 in the axial direction at a radial location of the outer periphery 49 of the sprocket body 43.

The radially inner sprocket-tooth center plane P2 is offset from the radially inner sprocket-body center plane P1 in the axial direction from the axially outwardly facing surface 33a toward the axially inwardly facing surface 33b.

As shown in FIG. 4, the at least one carrier mounting portion 53 is configured to be mounted on the sprocket mounting portion 55. The at least one carrier mounting portion 53 is disposed on the inner periphery 51 of the main body 47 in the circumferential direction.

In this embodiment, the at least one carrier mounting portion 53 includes a plurality of carrier mounting portions 53. The total number of the plurality of carrier mounting portions 53 is five. However, the total number of the plurality of carrier mounting portions 53 is not limited to the embodiment. The carrier mounting portions 53 are integrally formed with the main body 47 on an inner periphery 51 of the main body 47. The carrier mounting portions 53 are disposed at intervals from each other in the circumferential direction.

As shown in FIG. 4, the at least one slide opening 57 of the at least one carrier mounting portion 53 is configured to receive the at least one slide shaft 37.

As shown in FIGS. 4 and 6, the at least one slide opening 57 is configured to receive the at least one slide shaft 37 so that the front sprocket 33 is displaceable relative to the sprocket carrier 35 in at least the axial direction.

As shown in FIG. 6, the at least one slide opening 57 is configured to receive the at least one slide shaft 37 between a first shaft-supporting portion 61 and a second shaft-supporting portion 63 so that the front sprocket 33 is displaceable relative to the sprocket carrier 35 in at least the axial direction.

In this embodiment, as shown in FIG. 4, the at least one slide opening 57 includes a plurality of slide openings 57. Each of the plurality of slide openings 57 penetrates each of the plurality of carrier mounting portions 53. The total number of the plurality of slide openings 57 is five. However, the total number of the plurality of slide openings 57 is not limited to the embodiment.

As shown in FIG. 5, the plurality of sprocket teeth 45 are disposed on the outer periphery 49 of the sprocket body 43 in the circumferential direction. Specifically, the plurality of sprocket teeth 45 are integrally formed with the sprocket body 43. However, the plurality of sprocket teeth 45 can be separate members from the sprocket body 43. The plurality of sprocket teeth 45 are disposed on the outer periphery 49 of the main body 47 and is disposed at intervals from each other in the circumferential direction.

As shown in FIGS. 4 and 6, the sprocket carrier 35 has the at least one sprocket mounting portion 55. The at least one sprocket mounting portion 55 is configured to be coupled to the at least one carrier mounting portion 53 of the front sprocket 33 in a torque-transmitting manner.

The sprocket carrier 35 is mounted to the one of the pair of crank arms 29 and 30. Alternatively, the sprocket carrier 35 can be mounted to the crank shaft 27. In this embodiment, the sprocket carrier 35 is mounted to the right crank arm 29.

Figure 7:
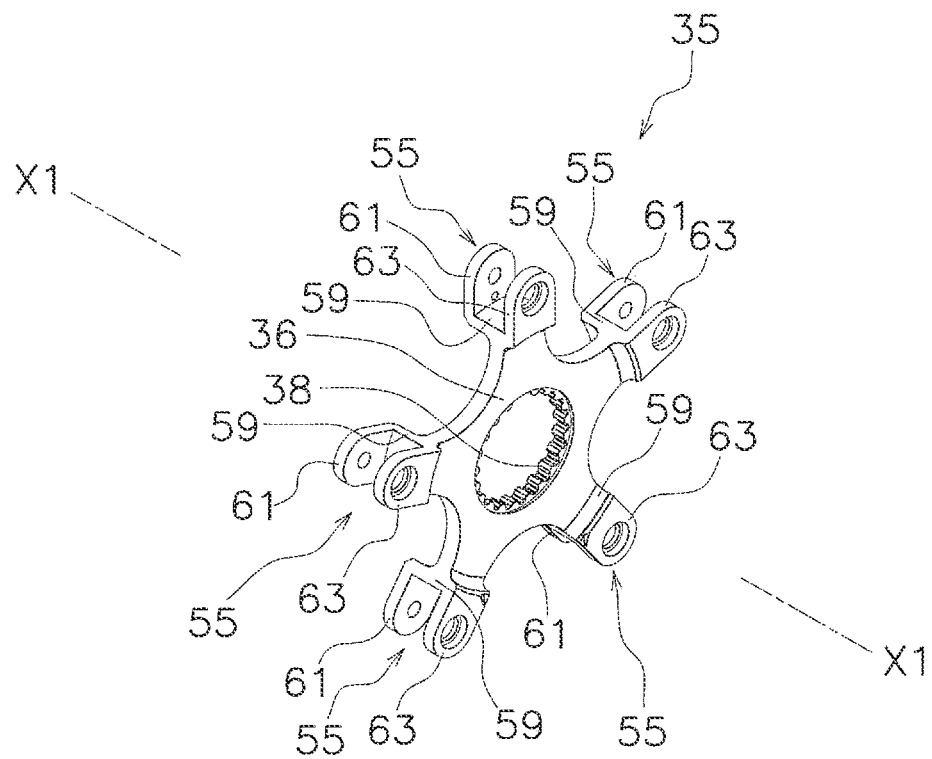
FIG. 7 is a perspective view of a sprocket carrier of the crank assembly according to the first embodiment.

As shown in FIG. 7, the sprocket carrier 35 has a carrier body 36 and the at least one sprocket mounting portion 55. The sprocket carrier 35 further has an assembly mounting portion 38. In this embodiment, the assembly mounting portion 38 penetrates the carrier body 36 in the axial direction with respect to the rotational center axis X1. The assembly mounting portion 38 is a mounting opening.

As shown in FIG. 6, the assembly mounting portion 38 is disposed on the assembly mountable portion 29b of the right crank arm 29 in a torque-transmitting manner. The assembly mounting portion 38 is non-rotatably disposed on the assembly mountable portion 29b of the right crank arm 29 with a spline engagement.

As shown in FIG. 6, the at least one sprocket mounting portion 55 is configured to support the front sprocket 33. The at least one sprocket mounting portion 55 is configured to be coupled to the at least one carrier mounting portion 53 of the front sprocket 33 in a torque-transmitting manner.

In this embodiment, as shown in FIG. 7, the at least one sprocket mounting portion 55 includes a plurality of sprocket mounting portions 55. The total number of the plurality of sprocket mounting portions 55 is five. However, the total number of the plurality of sprocket mounting portions 55 is not limited to the embodiment.

Each of the plurality of sprocket mounting portions 55 has a base body 59, the first shaft-supporting portion 61 and the second shaft-supporting portion 63. The base body 59 is integrally formed with the carrier body 36 of the sprocket carrier 35. For example, the plurality of base bodies 59 are respectively provided on the carrier body 36 of the sprocket carrier 35.

As shown in FIG. 7, the first shaft-supporting portion 61 is provided on each of the plurality of base bodies 59. The first shaft-supporting portion 61 extends from each of the plurality of base bodies 59 in the radial direction with respect to the rotational center axis X1.

As shown in FIG. 6, the first shaft-supporting portion 61 is configured to support a first shaft end 65a of the at least one slide shaft 37. The first shaft-supporting portion 61 includes a first opening 61a in which the first shaft end 65a of the at least one slide shaft 37 is disposed.

As shown in FIG. 7, the second shaft-supporting portion 63 is provided on each of the plurality of base bodies 59. The second shaft-supporting portion 63 is disposed at an interval from the first shaft-supporting portion 61 in the axial direction with respect to the rotational center axis X1.

The second shaft-supporting portion 63 extends from each of the plurality of base bodies 59 in the radial direction with respect to the rotational center axis X1.

As shown in FIG. 6, the second shaft-supporting portion 63 is configured to support a second shaft end 65b of the at least one slide shaft 37. The second shaft-supporting portion 63 includes a second opening 63a in which the second shaft end 65b of the at least one slide shaft 37 is mounted.

An axial distance D1 between the first shaft-supporting portion 61 and the second shaft-supporting portion 63 is equal to or larger than an axial width D1 of the slide member 39.

As shown in FIGS. 4 and 6, the at least one slide shaft 37 has the shaft center axis SX1, the first shaft end 65a and the second shaft end 65b opposite to the first shaft end 65a in a shaft axial direction with respect to the shaft center axis SX1. In this embodiment, the at least one slide shaft 37 includes a plurality of slide shafts 37. The total number of the plurality of slide shafts 37 is five. However, the total number of the plurality of slide shafts 37 is not limited to the embodiment.

The shaft axial direction is defined by a direction in which the shaft center axis SX1 extends. Preferably, the shaft axial direction is parallel to the rotational center axis X1 in an assembled state of the front sprocket assembly 31. The shaft axial direction is parallel to the axial direction of the front sprocket assembly 31 in an assembled state of the front sprocket assembly 31.

The shaft radial direction is defined by a direction which vertically separates from the shaft center axis SX1. The shaft circumferential direction is defined by a direction which extends around the shaft center axis SX1.

The at least one slide shaft 37 is mounted to the one of the at least one carrier mounting portion 53 of the sprocket body 43 and the at least one sprocket mounting portion 55 of the sprocket carrier 35.

In this embodiment, as shown in FIGS. 4 and 6, the at least one slide shaft 37 is mounted to the at least one sprocket mounting portion 55 of the sprocket carrier 35. Specifically, the plurality of slide shafts 37 are respectively mounted to the plurality of sprocket mounting portion 55 of the sprocket carrier 35.

As shown in FIG. 4, the at least one slide shaft 37 includes a supporting spindle 65 and a slide cover 67. Specifically, each of the plurality of slide shafts 37 includes a supporting spindle 65 and a slide cover 67. The slide cover 67 can be omitted according to need so that the slide member 39 directly slide relative to the supporting spindle 65.

The supporting spindle 65 extends along the shaft center axis SX1. The supporting spindle 65 is made of a spindle material. The spindle material is lighter than a cover material of the slide cover 67. The spindle material includes aluminum.

As shown in FIG. 6, the supporting spindle 65 has an intermediate portion 65c positioned between the first shaft end 65a and the second shaft end 65b in the shaft axial direction. In other words, the supporting spindle 65 has the first shaft end 65a, the second shaft end 65b and the intermediate portion 65c.

The first shaft end 65a is provided on one end side of the intermediate portion 65c. The first shaft end 65a is formed with a larger diameter than the intermediate portion 65c in this embodiment. The first shaft end 65a abuts to the first shaft-supporting portion 61.

The second shaft end 65b is provided on the other end side of the intermediate portion 65c. The second shaft end 65b threadedly engages with the second opening 63a of the second shaft-supporting portion 63 in this embodiment.

The intermediate portion 65c is integrally formed with the first shaft end 65a and the second shaft end 65b. The intermediate portion 65c is inserted in the first opening 61a of the first shaft-supporting portion 61.

As shown in FIGS. 4 and 6, the slide cover 67 is configured to be disposed on the supporting spindle 65. For example, the slide cover 67 is configured to be disposed on the intermediate portion 65c. The slide cover 67 is formed in a tubular shape. The slide cover 67 is disposed between the intermediate portion 65c and the slide opening 57 of each of the carrier mounting portions 53 in the shaft radial direction.

The slide cover 67 is made of the cover material that is harder than the spindle material. The slide cover 67 is made of the cover material that is harder than a base material of the slide member 39. The cover material includes iron.

As shown in FIGS. 4 and 6, the slide member 39 is configured to be mounted to the at least one slide opening 57. The slide member 39 is further configured to slide relative to the at least one slide shaft 37. Specifically, the slide member 39 is configured to be mounted to the at least one slide opening 57, and is configured to slide relative to the slide cover 67 of the at least one slide shaft 37.

The slide member 39 includes at least one slide member 39. In this embodiment, the at least one slide member 39 includes a plurality of slide members 39. Each of the plurality of slide members 39 is configured to be mounted to each of the plurality of slide openings 57 and is configured to slide relative to the slide cover 67 of each of the plurality of slide shafts 37.

Figure 8:
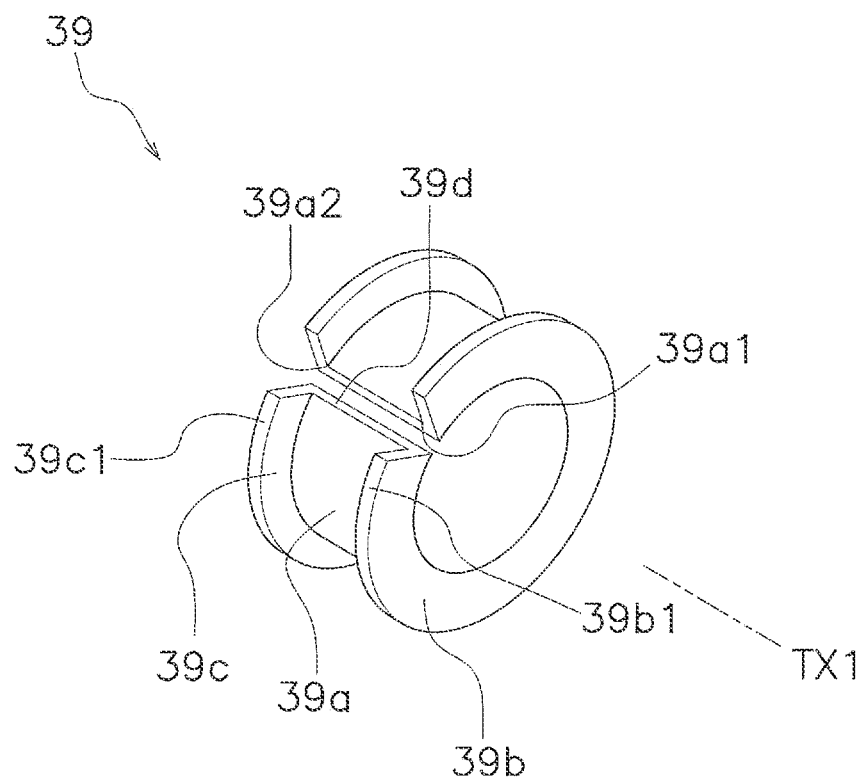
FIG. 8 is a perspective view of a slide member of the crank assembly according to the first embodiment.

As shown in FIG. 8, the slide member 39 includes a tubular portion 39a, a first flange 39b and a second flange 39c. The first flange 39b, the second flange 39c and the tubular portion 39a is formed as a unitary, one-piece member. The slide member 39 has a slit 39d.

The tubular portion 39a is formed in a tubular shape. The tubular portion 39a is mounted in the slide opening 57 of each of the plurality of carrier mounting portions 53. The slide opening 57 is shown in FIG. 6.

The tubular portion 39a is disposed between the slide opening 57 of each of the plurality of carrier mounting portions 53 and the slide cover 67 of each of the plurality of slide shafts 37 in the shaft radial direction. The tubular portion 39a slides relative to the slide cover 67 of the slide shaft 37. The carrier mounting portions 53 and the slide cover 67 are shown in FIG. 6.

As shown in FIG. 8, the tubular portion 39a has a tube center axis TX1, a first tubular end 39a1 and a second tubular end 39a2. The tube center axis TX1 defines a tube axial direction, a tube radial direction and a tube circumferential direction. The tube center axis TX1 is coaxial with the shaft center axis SX1.

The tube axial direction is defined by a direction in which the tube center axis TX1 extends. Preferably, the tube axial direction is parallel to the rotational center axis X1 in an assembled state of the front sprocket assembly 31. The tube axial direction is parallel to the axial direction of the front sprocket assembly 31 in an assembled state of the front sprocket assembly 31.

The tube radial direction is defined by a direction which vertically separates from the tube center axis TX1. The shaft circumferential direction is defined by a direction which extends around the tube center axis TX1.

As shown in FIG. 8, the first tubular end 39a1 is one end of the tubular portion 39a. The second tubular end 39a2 is the other end of the tubular portion 39a. The first tubular end 39a1 is opposite to the second tubular end 39a2 with respect to the tubular portion 39a in the tube axial direction.

The first flange 39b extends outwardly from the first tubular end 39a1 of the tubular portion 39a in the tube radial direction. The first flange 39b extends in the tube circumferential direction. For example, the first flange 39b is formed in an annular shape. The first flange 39b faces to the axially outwardly facing surface 33a of each of the plurality of carrier mounting portions 53 in the tube axial direction in an assembled state of the front sprocket assembly 31. The axially outwardly facing surface 33*a* is shown in FIG. 6.

The second flange 39*c* extends outwardly from the second tubular end 39*a*2 of the tubular portion 39*a* in the tube radial direction. The second flange 39*c* extends in the tube circumferential direction. For example, the second flange 39*c* is formed in an annular shape. The second flange 39*c* faces to the axially inwardly facing surface 33*b* of each of the plurality of carrier mounting portions 53 in the tube axial direction in an assembled state of the front sprocket assembly 31. The axially inwardly facing surface 33*b* is shown in FIG. 6.

The slit 39*d* is provided on the slide member 39. The slit 39*d* extends from the first tubular end 39*a*1 to the second tubular end 39*a*2. Specifically, the slit 39*d* extends on the tubular portion 39*a* from the first tubular end 39*a*1 to the second tubular end 39*a*2 in the tube axial direction.

The slit 39*d* extends from the first tubular end 39*a*1 to an outer peripheral edge 39*b*1 of the first flange 39*b* in the tube radial direction. The slit 39*d* extends from the second tubular end 39*a*2 to an outer peripheral edge 39*c*1 of the second flange 39*c* in the tube radial direction.

Figure 9:
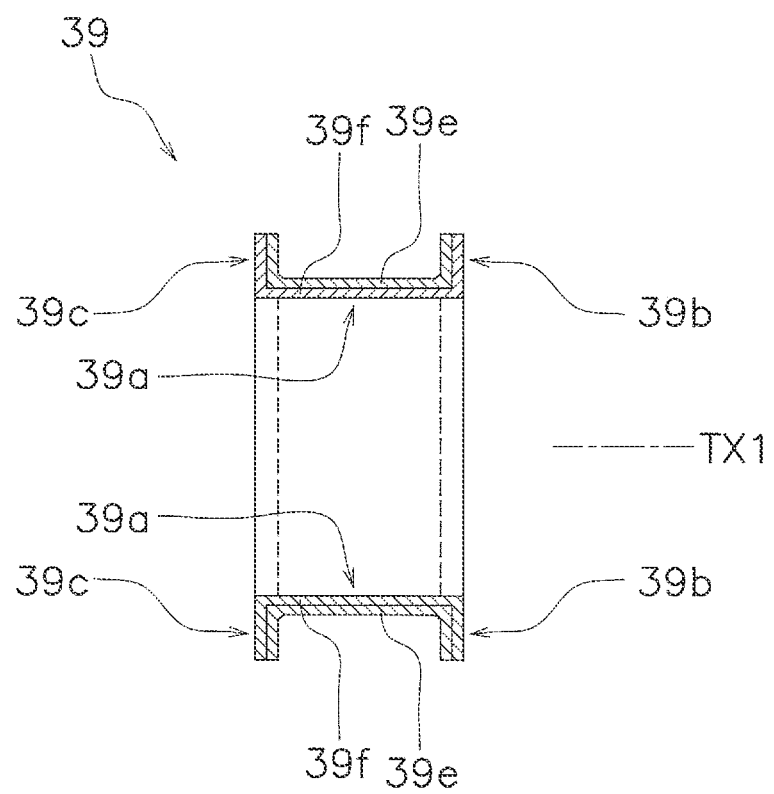
FIG. 9 is a cross-sectional view of the slide member illustrated in FIG. 8 according to the first embodiment.

As shown in FIG. 9, the slide member 39 includes the base metal 39*e* and a resin layer 39*f*. The base metal 39*e* is configured to be mounted to the at least one slide opening 57. The slide opening 57 is shown in FIG. 6. In this embodiment, the base metal 39*e* is configured to be mounted to each of the plurality of slide openings 57.

Specifically, the base metal 39*e* is mounted to so as to face to an inner periphery of each of the plurality of slide openings 57. The base metal 39*e* is made of a base material. The base metal 39*e* is made of the base material including iron.

The resin layer 39*f* is disposed on the base metal 39*e* and is configured to slide relative to the at least one slide shaft 37. For example, the resin layer 39*f* is disposed on the base metal 39*e* and is configured to slide relative to the slide cover 67.

The slide shaft 37 is shown in FIG. 6. For example, the resin layer 39*f* is disposed on the base metal 39*e* and is configured to slide relative to each of the plurality of slide covers 67. The slide cover 67 is shown in FIG. 6.

The resin layer 39*f* is made of a resin material including solid lubricant. Preferably, the solid lubricant includes polytetrafluoroethylene. The resin layer 39*f* can include metallic fabric.

The slide member 39 is formed as follows. As shown in FIG. 10A, a base member 40 is used to form the slide member 39. The base member 40 is initially formed in a plate shape. The base member 40 includes the base metal 39*e* and the resin layer 39*f* which are shown in FIG. 9. The base metal 39*e* is provided on one surface side thereof. The resin layer 39*f* is provided on the other surface side thereof. The base member 40 is then molded and bent to form the slide member 39 having a final shape as seen in FIG. 8.

In particular, first, as shown in FIG. 10B, the base member 40 is formed from the plate shape of FIG. 10A into a tubular shape with the slit 39*d* by a molding device. This operation causes the tubular portion 39*a* and the slit 39*d* to be formed. Second, as shown in FIG. 10C, one end of the base member 40 is bent by a bending device. Specifically, the one end of the base member 40 is bent by the bending device in a state where the resin layer 39*f* is disposed on an upstream side in a bending direction and the base metal 39*e* is disposed on a downstream side in the bending direction. This operation causes the tubular portion 39*a*, the slit 39*d* and the first flange 39*b* to be formed. The base metal 39*e* is disposed on a radially outer peripheral side of the tubular portion 39*a* in the tube radial direction. The resin layer 39*f* is disposed on a radially inner peripheral side of the tubular portion 39*a* in the tube radial direction.

In the state shown in FIG. 10C, the tubular portion 39*a* is mounted in the slide opening 57 and the first flange 39*b* faces to the axially outwardly facing surface 33*a* of the carrier mounting portion 53 in the tube axial direction.

Finally, as shown in FIG. 10D, the second flange 39*c* is formed by swaging the other end of the base member 40. The second flange 39*c* faces to the axially inwardly facing surface 33*b* of the carrier mounting portion 53 in the tube axial direction. These operation cause the slide member 39 to be configured as shown in FIG. 8 and FIG. 10D.

Figure 11:
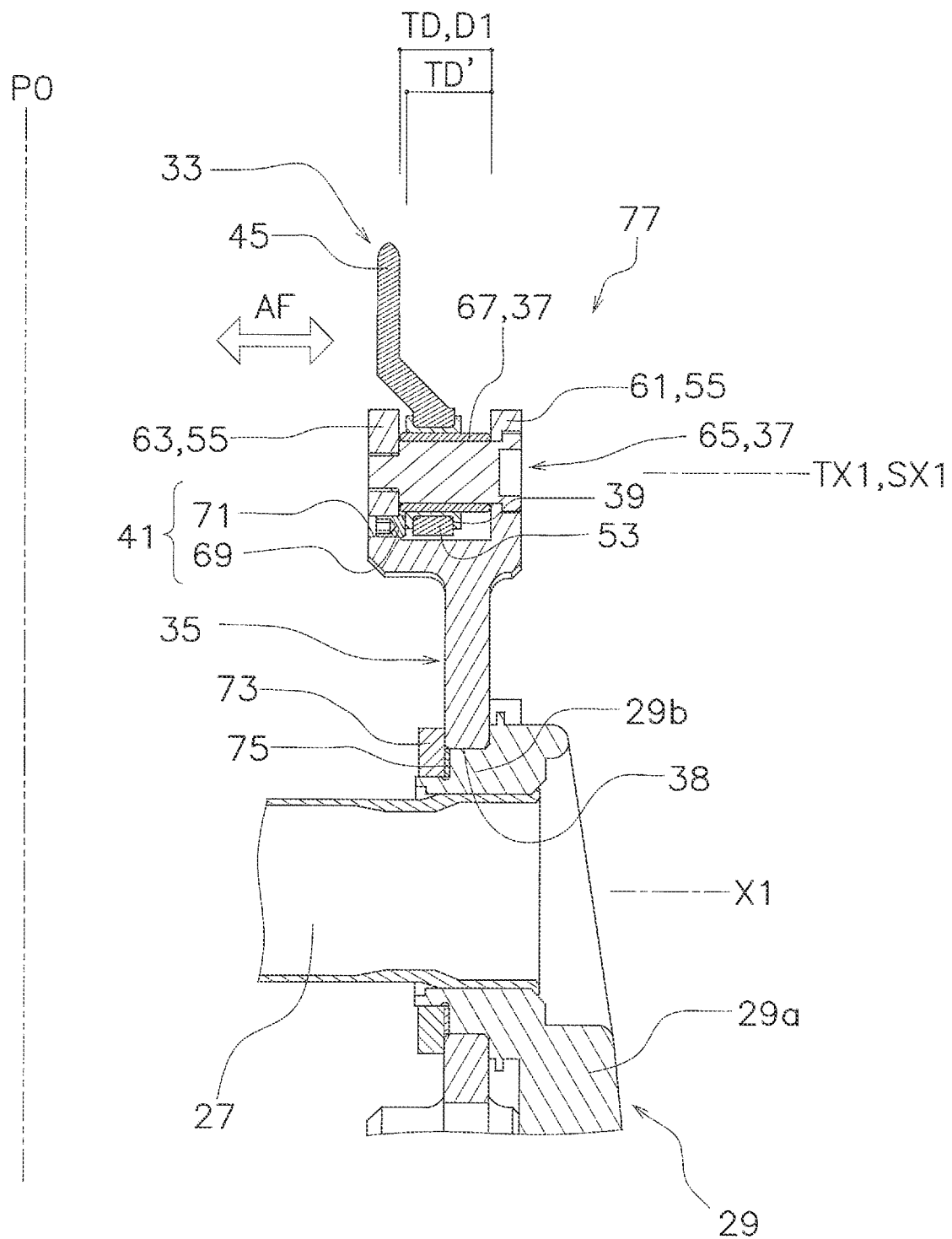
FIG. 11 is a partial cross-sectional view of the crank assembly according to the first embodiment.

As shown in FIG. 11, the travel-distance adjustment structure 41 is configured to adjust a travel distance TD of the front sprocket 33 relative to the sprocket carrier 35 in the axial direction. A maximum travel distance TD corresponds to the axial distance D1 between the first shaft-supporting portion 61 and the second shaft-supporting portion 63.

The travel-distance adjustment structure 41 can be provided to the at least one carrier mounting portion 53 of the sprocket body 43 or the at least one sprocket mounting portion 55 of the sprocket carrier 35.

In this embodiment, the travel-distance adjustment structure 41 is provided to the at least one sprocket mounting portion 55 of the sprocket carrier 35.

The travel-distance adjustment structure 41 is provided to in a case where the at least one slide shaft 37 is mounted to the at least one carrier mounting portion 53 of the sprocket body 43 and where the at least one slide opening 57 is provided to the at least one sprocket mounting portion 55 of the sprocket carrier 35.

As shown in FIG. 11, the travel-distance adjustment structure 41 restricts the travel distance TD of the front sprocket 33, for example, a displaceable distance of the front sprocket 33 such as an axial slide distance of the front sprocket 33. The travel-distance adjustment structure 41 includes a travel limiter 69. The travel-distance adjustment structure 41 includes a limiter-receiving hole 71.

Figure 12:
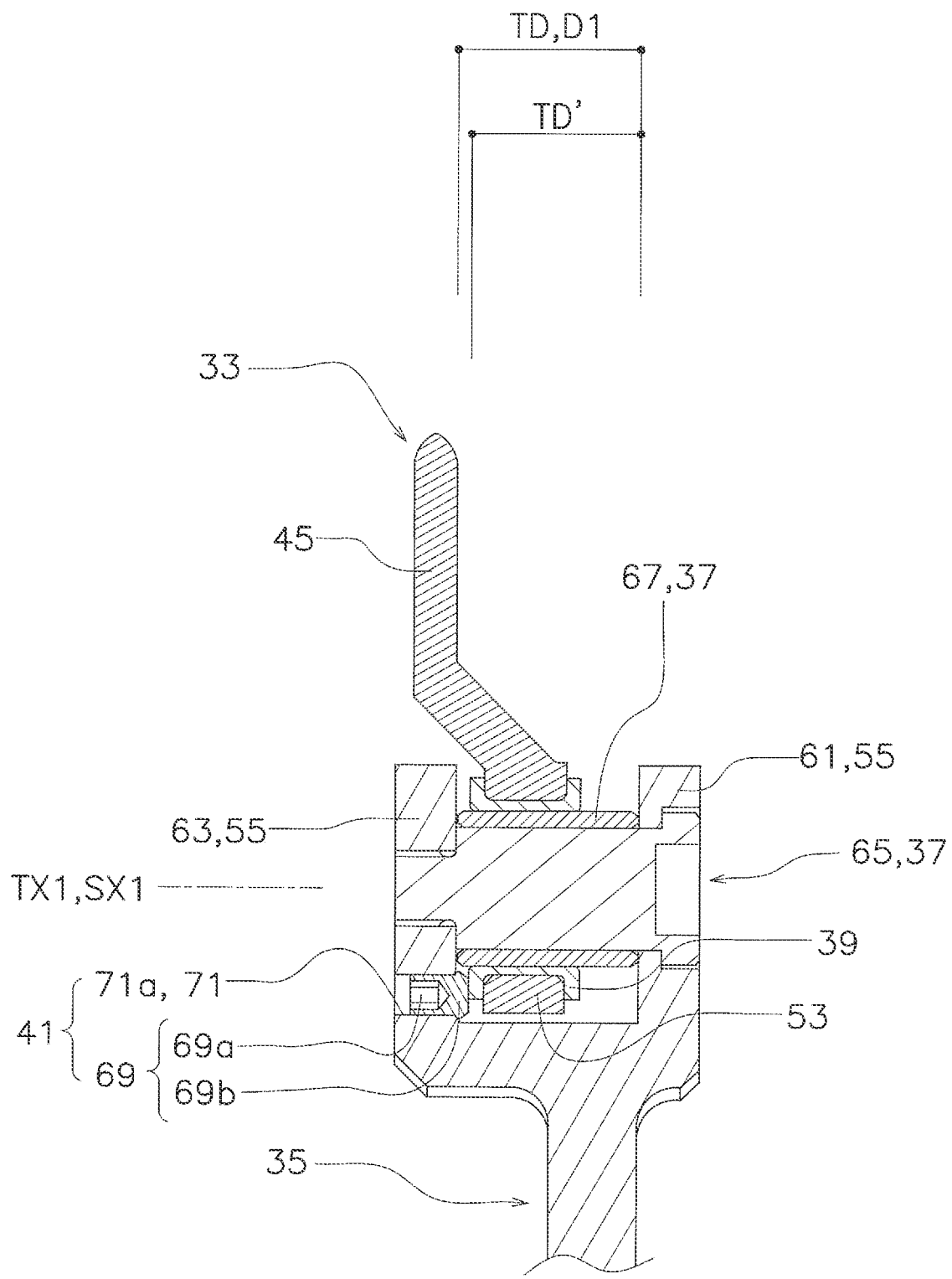
FIG. 12 is an enlarged partial cross-sectional view of a travel-distance adjustment structure of the crank assembly according to the first embodiment.

As shown in FIG. 12, the travel limiter 69 is configured to abut on the other of the at least one carrier mounting portion 53 of the sprocket body 43 and the at least one sprocket mounting portion 55 of the sprocket carrier 35.

In this embodiment, the travel limiter 69 is configured to abut on the at least one carrier mounting portion 53 of the sprocket body 43. Specifically, the travel limiter 69 is configured to abut on the carrier mounting portion 53 via the slide member 39 in this embodiment.

The travel limiter 69 is mounted to the limiter-receiving hole 71. The travel limiter 69 has a limiter threaded portion 69*a*. For example, the travel limiter 69 has the limiter threaded portion 69*a* and an abutment portion 69*b*.

The limiter threaded portion 69*a* is configured to threadedly engage with the limiter-receiving hole 71. For example, the limiter threaded portion 69*a* is a male screw portion. The abutment portion 69*b* is integrally formed with the limiter threaded portion 69*a*. The abutment portion 69*b* abuts on the slide member 39 in this embodiment.

As shown in FIG. 12, the limiter-receiving hole 71 is configured to receive and hold the travel limiter 69. The limiter-receiving hole 71 is provided to the one of the at least one carrier mounting portion 53 of the front sprocket 33 and the at least one sprocket mounting portion 55 of the sprocket carrier 35.

In this embodiment, the limiter-receiving hole 71 is provided to the at least one sprocket mounting portion 55 of the sprocket carrier 35. Specifically, the limiter-receiving hole 71 is provided to the sprocket mounting portion 55 of the sprocket carrier 35. The limiter-receiving hole 71 can be provided to one or more sprocket mounting portions 55.

The limiter-receiving hole 71 has a limiter-receiving threaded portion 71a. The limiter-receiving threaded portion 71a is configured to threadedly engage with the limiter threaded portion 69a. For example, the limiter-receiving threaded portion 71a is a female screw portion.

The limiter threaded portion 69a is screwed into the limiter-receiving threaded portion 71a. In this state, the abutment portion 69b protrudes from the second shaft-supporting portion 63 of the sprocket mounting portion 55 toward the first shaft-supporting portion 61 of the sprocket mounting portion 55.

The travel distance TD of the front sprocket 33, for example, the axial slide distance of the front sprocket 33 is restricted by abutting the abutment portion 69b against the slide member 39, for example, the second flange 39c.

After the travel distance TD of the front sprocket 33 is adjusted with the travel-distance adjustment structure 41, the adjusted travel distance of the front sprocket 33 is indicated by a sign "TD" in FIGS. 11 and 12.

As shown in FIGS. 4 and 11, the front sprocket assembly 31 is mounted to the right crank arm 29 by a lock nut 73. The lock nut 73 positions the sprocket carrier 35 of the front sprocket assembly 31 with respect to the right crank arm 29. For example, the lock nut 73 is mounted to the assembly mountable portion 29b of the right crank arm 29.

Specifically, the lock nut 73 is mounted to the assembly mountable portion 29b of the right crank arm 29 via a shim ring 75 in a state where the assembly mounting portion 38 of the sprocket carrier 35 is disposed on the assembly mountable portion 29b of the right crank arm 29.

In other words, the sprocket carrier 35 of the front sprocket assembly 31 is fixed by the lock nut 73 and the right crank arm 29 in a state where the sprocket carrier 35 is disposed between the lock nut 73 and the right crank arm 29 in the axial direction.

As shown in FIG. 11, the front sprocket assembly 31 includes a sprocket-displaceable structure 77. The sprocket-displaceable structure 77 is configured so that the front sprocket 33 is displaceable relative to the sprocket carrier 35 in at least the axial direction.

For example, the sprocket-displaceable structure 77 is configured so that the front sprocket 33 slides relative to the sprocket carrier 35 in the axial direction in a state where the front sprocket assembly 31 is mounted to the right crank arm 29 by the lock nut 73.

The travel distance TD corresponds to a maximum sliding amount. The maximum sliding amount TD, at which the front sprocket 33 slides with respect of the sprocket carrier 35, is equal to or larger than 3.0 mm and is equal to or smaller than 9.0 mm. In this embodiment, the maximum sliding amount is 5.0 mm.

The sprocket-displaceable structure 77 includes the front sprocket 33, the sprocket carrier 35, the plurality of slide shafts 37 and the plurality of slide members 39.

When driving force acts on the front sprocket 33 from the drive chain 15 and an axial force AF of the driving force acts on the front sprocket 33 by the drive chain 15 which is shifted by a rear derailleur 21, the front sprocket 33 moves relative to the sprocket carrier 35 in the axial direction via the sprocket-displaceable structure 77.

Specifically, the front sprocket 33 moves relative to the sprocket carrier 35 by allowing the plurality of slide members 39 to slide respectively along the plurality of slide covers 67 in the axial direction while the axial component AF acts on the front sprocket 33. As a result, the driving force is efficiently transmitted from the drive chain 15 to the front sprocket 33 by moving the front sprocket 33 via the sprocket-displaceable structure 77. Further, it is possible to inhibit the drive chain from disengaging the front sprocket 33 because of axial movement of the front sprocket 33 by the sprocket-displaceable structure 77.

Second Embodiment

Figure 13:
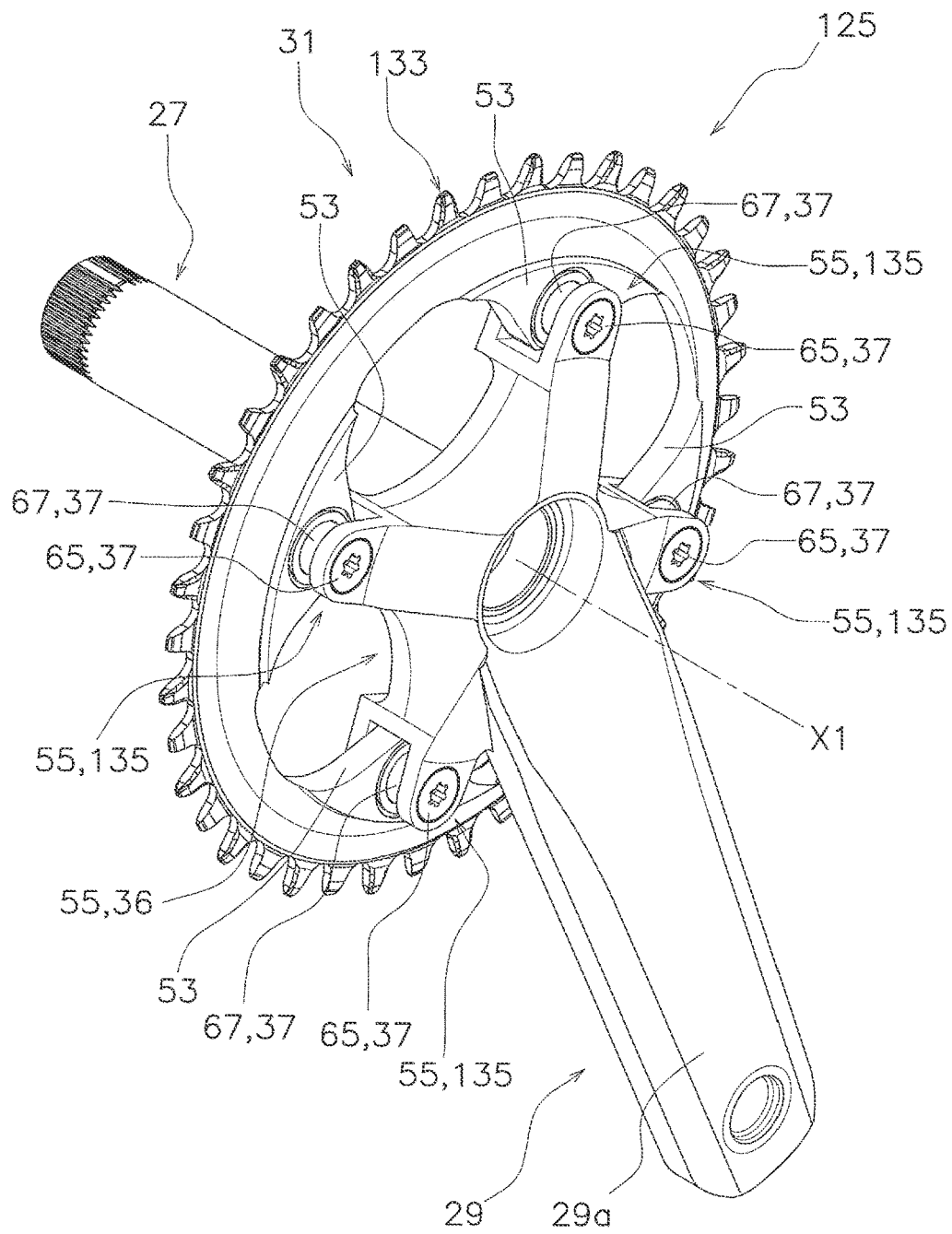
FIG. 13 is a perspective view of a crank assembly according to a second embodiment.

In the second embodiment, the crank assembly 25 of the first embodiment can be configured as follows. As shown in FIG. 13, the crank assembly 125 has substantially the same configuration as the crank assembly 25 of the first embodiment. Specific explanations of those parts, members and portions having substantially the same configurations as parts, members and portions of the first embodiment are omitted in the second embodiment. In the second embodiment, reference signs used to identify a parts, members and portions of the first embodiment are also used for parts, members and portions having substantially the same configuration. Thus, the above descriptions of parts, members and portions of the first embodiment have been omitted for parts, members and portions of the second embodiment that have substantially the same configurations.

In the second embodiment, as shown in FIG. 13, configuration of the front sprocket 133 and the sprocket carrier 135 is different from the first embodiment.

The front sprocket assembly 31 comprises the front sprocket 133, the sprocket carrier 135 and the at least one slide shaft 37. The front sprocket assembly 31 further comprises the slide member 39. The front sprocket assembly 31 further comprises the travel-distance adjustment structure 41.

The right crank arm 29 is integrally formed with the sprocket carrier 135. Specifically, the right crank arm 29 is integrally formed with the sprocket carrier 135 in a state where the right crank arm 29 is disposed between a pair of sprocket mounting portions 55 which are adjacent to each other in the circumferential direction. In this case, the right crank arm 29 is included in the front sprocket assembly 31.

The total number of the plurality of carrier mounting portions 53 of the front sprocket 133 is four. The total number of the plurality of slide openings 57 of the carrier mounting portion 53 is four. The total number of the plurality of sprocket mounting portions 55 of the sprocket carrier 135 is four. The total number of the plurality of slide shafts 37 is four. The total number of the slide member 39 is four. However, the total number of the plurality of carrier mounting portions 53, the total number of the plurality of slide openings 57, the total number of the plurality of sprocket mounting portions 55, and the total number of the plurality of slide shafts 37 are not limited to this embodiment.

The front sprocket 133 can displace relative to the sprocket carrier 135 in at least the axial direction in the same way as the first embodiment, even if the crank assembly 125 is configured as described above.

Variation of the First and Second Embodiments (A) In the above embodiments, the explanation of the sprocket-displaceable structure 77 is performed with an example that the sprocket-displaceable structure 77 includes the front sprocket 33 or 133, the sprocket carrier 35 or 135, at least one slide shaft 37 and at least one slide member 39.

The sprocket-displaceable structure 77 can include the front sprocket 33 or 133, the sprocket carrier 35 or 135, at least one slide shaft 37 and at least one rolling element such as at least one ball, at least one roller, and the like.

In this case, the at least one rolling element is disposed between the at least one slide shaft 37 and at least one slide opening 57 of the front sprocket 33 or 133 in the shaft radial direction. In this state, the front sprocket 33 or 133 slides relative to the at least one slide shaft 37.

(B) In the above embodiments, the explanation of the sprocket-displaceable structure 77 is performed with an example that each of the sprocket mounting portions 55 of the sprocket carrier 35 or 135 is configured to be coupled to each of the carrier mounting portion 53 of the front sprocket 33, 133.

Any one of the sprocket mounting portions 55 of the sprocket carrier 35 or 135 can be configured to be coupled to any one of the carrier mounting portions 53 of the front sprocket 33 or 133.

In the present application. the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts. The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element." The term "pair of," as used herein, can encompass the configuration in which the pair of elements have different shapes or structures from each other in addition to the configuration in which the pair of elements have the same shapes or structures as each other. The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A front sprocket assembly for a human-powered vehicle, the front sprocket assembly having a rotational center axis defining an axial direction, a radial direction and a circumferential direction, the front sprocket assembly comprising:
   a front sprocket including:
      a sprocket body having at least one carrier mounting portion; and
      a plurality of sprocket teeth disposed on an outer periphery of the sprocket body in the circumferential direction;
   a sprocket carrier having at least one sprocket mounting portion configured to be coupled to the at least one carrier mounting portion of the sprocket body in a torque-transmitting manner; and
   at least one slide shaft having a shaft center axis, a first shaft end and a second shaft end, the second shaft end being opposite to the first shaft end in a shaft axial direction with respect to the shaft center axis, the at least one slide shaft being mounted to one of the at least one carrier mounting portion of the sprocket body and the at least one sprocket mounting portion of the sprocket carrier;
   the one of the at least one carrier mounting portion of the sprocket body and the at least one sprocket mounting portion of the sprocket carrier having a first shaft-supporting portion and a second shaft-supporting portion spaced apart from the first shaft-supporting portion in the shaft axial direction, the first shaft-supporting portion being configured to support the first shaft end of the at least one slide shaft, the second shaft-supporting portion being configured to support the second shaft end of the at least one slide shaft; and
   the other of the at least one carrier mounting portion of the sprocket body and the at least one sprocket mounting portion of the sprocket carrier having at least one slide opening configured to receive the at least one slide shaft between the first shaft-supporting portion and the second shaft-supporting portion so that the front sprocket is displaceable relative to the sprocket carrier in at least the axial direction.

2. The front sprocket assembly according to claim 1, wherein
   the shaft axial direction is parallel to the axial direction of the front sprocket assembly in an assembled state of the front sprocket assembly.

3. The front sprocket assembly according to claim 1 further comprising:
   a slide member configured to be mounted to the at least one slide opening and configured to slide relative to the at least one slide shaft.

4. The front sprocket assembly according to claim 3, wherein
   the slide member includes:
      a base metal configured to be mounted to the at least one slide opening; and
      a resin layer disposed on the base metal and configured to slide relative to the at least one slide shaft.

5. The front sprocket assembly according to claim 4, wherein
   the base metal is made of a base material including iron.

6. The front sprocket assembly according to claim 4, wherein the resin layer is made of a resin material including solid lubricant.

7. The front sprocket assembly according to claim 4, wherein
the solid lubricant includes polytetrafluoroethylene.

8. The front sprocket assembly according to claim 6, wherein
the resin layer includes metallic fabric.

9. The front sprocket assembly according to claim 1, wherein
the at least one slide shaft includes:
a supporting spindle having an intermediate portion positioned between the first shaft end and the second shaft end in the shaft axial direction; and
a slide cover configured to be disposed on the intermediate portion.

10. The front sprocket assembly according to claim 9, wherein
the supporting spindle is made of a spindle material; and
the slide cover is made of a cover material that is harder than the spindle material.

11. The front sprocket assembly according to claim 10, wherein
the spindle material is lighter than the cover material.

12. The front sprocket assembly according to claim 10, wherein
the spindle material includes aluminum.

13. The front sprocket assembly according to claim 10, wherein
the cover material includes iron.

14. The front sprocket assembly according to claim 9 further comprising:
a slide member configured to be mounted to the at least one slide opening and configured to slide relative to the slide cover of the at least one slide shaft.

15. The front sprocket assembly according to claim 14, wherein
the slide member includes:
a base metal configured to be mounted to the at least one slide opening; and
a resin layer disposed on the base metal and configured to slide relative to the slide cover.

16. The front sprocket assembly according to claim 15, wherein
the base metal is made of a base material; and
the slide cover is made of a cover material that is harder than the base material.

17. The front sprocket assembly according to claim 16, wherein
the spindle material is lighter than the cover material.

18. The front sprocket assembly according to claim 16, wherein
the base material includes iron.

19. The front sprocket assembly according to claim 16, wherein
the cover material includes iron.

20. The front sprocket assembly according to claim 1, wherein
the at least one slide shaft is mounted to the at least one sprocket mounting portion of the sprocket carrier.

21. The front sprocket assembly according to claim 20, wherein
the at least one sprocket mounting portion of the sprocket carrier has the first shaft-supporting portion and the second shaft-supporting portion.

22. The front sprocket assembly according to claim 20, wherein
the at least one carrier mounting portion of the sprocket body has the at least one slide opening.

23. The front sprocket assembly according to claim 22 further comprising:
a slide member configured to be mounted to the at least one slide opening and configured to slide relative to the at least one slide shaft.

24. The front sprocket assembly according to claim 23, wherein
the slide member includes:
a base metal configured to be mounted to the at least one slide opening; and
a resin layer disposed on the base metal and configured to slide relative to the at least one slide shaft.

* * * * *